United States Patent [19]

Sakurai

[11] Patent Number: 4,953,288

[45] Date of Patent: Sep. 4, 1990

[54] WHEEL PRESETTING APPARATUS

[75] Inventor: Hiromi Sakurai, Nagoya, Japan

[73] Assignee: Mitsubishi Jidosha Kogyo Kabushiki Kaisha, Tokyo, Japan

[21] Appl. No.: 394,810

[22] Filed: Aug. 16, 1989

[30] Foreign Application Priority Data

Aug. 30, 1988 [JP] Japan ............................ 63-213578
Aug. 30, 1988 [JP] Japan ............................ 63-213579
Aug. 30, 1988 [JP] Japan ............................ 63-213580

[51] Int. Cl.⁵ .......................................... B23P 21/00
[52] U.S. Cl. ........................................ 29/704; 29/714
[58] Field of Search ................... 29/705, 714, 783, 791

[56] References Cited

U.S. PATENT DOCUMENTS 3,507,027 4/1970 Jaulmes ................... 29/705

FOREIGN PATENT DOCUMENTS 3246220 6/1984 Fed. Rep. of Germany ........ 29/705
122872 6/1987 Japan ..................................... 29/705

Primary Examiner—Timothy V. Eley
Attorney, Agent, or Firm—Abelman Frayne Rezac & Schwab

[57] ABSTRACT

A wheel presetting apparatus has a pair of rotatable lower rollers and a pair of rotatable upper rollers mounted above the lower rollers and movable into contact with a wheel supported on the lower rollers. A center pin is supported for forward and backward movement in relation to a center hole of the wheel, and, a bolt hole detecting means is provided for detecting the angular position of a bolt hole of the wheel. A hub pin is supported for forward and backward movement, and is inserted into a bolt hole which is out of the phase of the bolt holes detected by the bolt hole detecting means.

11 Claims, 12 Drawing Sheets

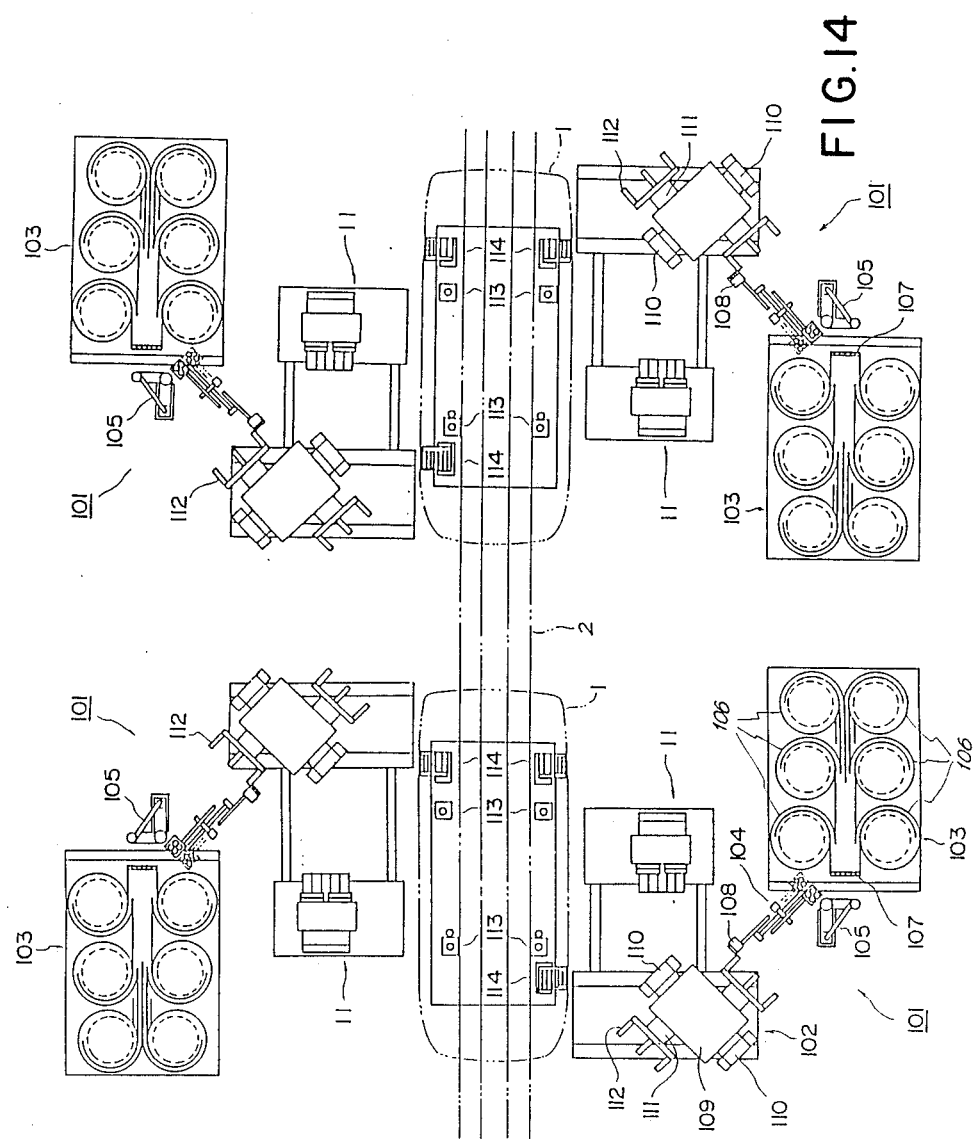

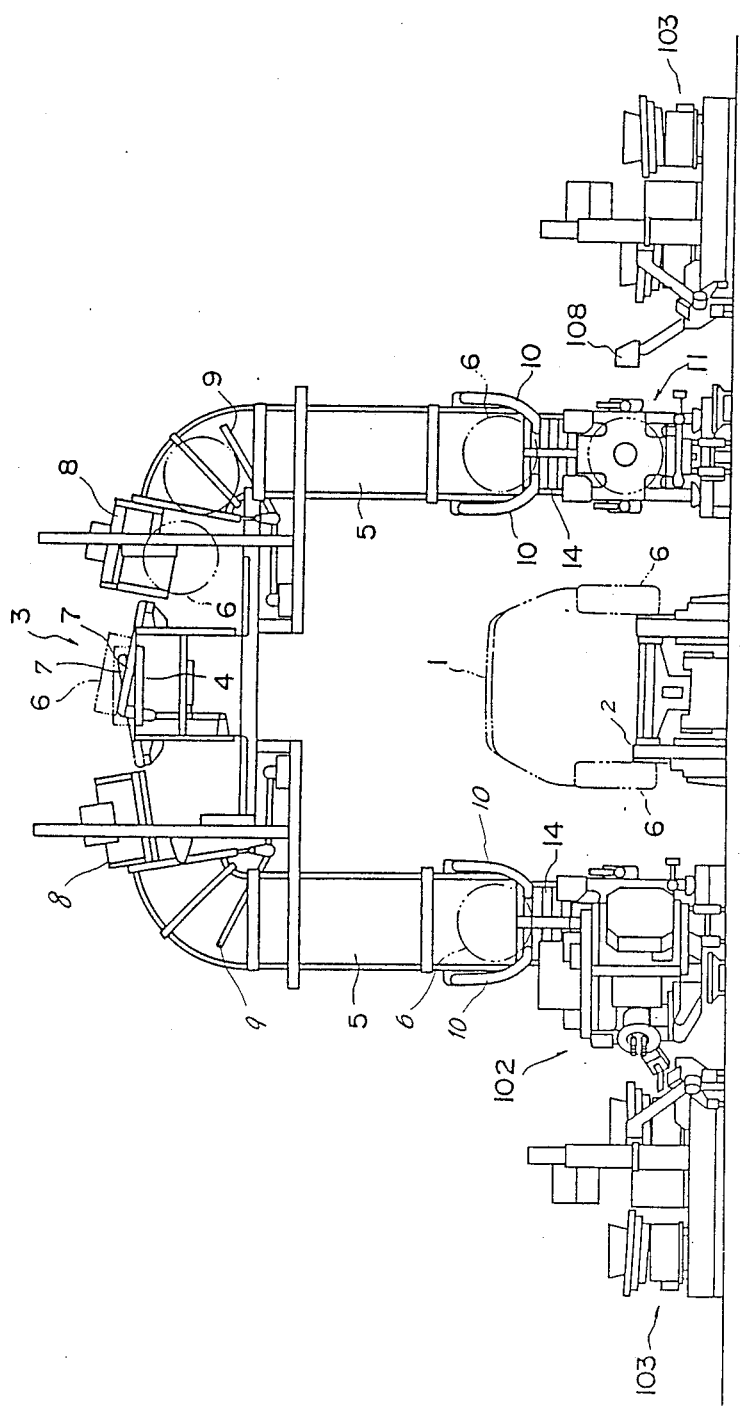

WHEEL PRESETTING APPARATUS

FIELD OF THE INVENTION

The present invention relates to an apparatus adapted to rotate a wheel to a determined angular position, and also to a position in which a wheel can be held by a robot and then mounted by the robot onto a hub on an automobile.

In the automatic assembly of automobiles, an apparatus for automatically mounting wheels to hubs of the automobile becomes necessary.

Such an automatic wheel mounting apparatus comprises a robot for positioning a wheel to a hub of an automobile and for tightening hub nuts, a nut feeding device for feeding hub nuts to the robot, and a wheel feeder for feeding wheels.

To properly position a wheel on a hub and insert hub bolts into bolt holes of the wheel, it is necessary to adjust the rotational position of the hub bolts to that of the bolt holes in the wheel. For example, in the case of a hub having four hub bolts, the wheel position also must be adjusted such that bolt holes thereof are in the same angular position as the hub bolts.

However, the wheel feeder does not necessarily feed the wheel with the circumferential direction thereof exactly adjusted to the position of the hub bolts.

Therefore, it is necessary to adjust the angular position of a wheel to a specific angle related to the position of the hub bolts.

Furthermore, wheels can be of several widths, from narrow to wide. Therefore, when a wheel is held by wheel holding pawls of the robot, holding of the wheel in the direction of its width varies with a difference in wheel width, resulting in unstable wheel holding.

In an automatic wheel mounting operation, it is desirable that the wheel mounting robot grasp the wheel uniformly in the direction of its width. Thus requires that the stroke of the wheel holding pawls be changed according to the width of tires of wheels to be mounted. This, however, will require complicated robot movement.

This type of wheel mounting apparatus has been disclosed in related technical literature such a LaidOpen Japanese Patent Application No. 62-173303 and Japanese Patent Publication No. 59-51442.

In the automatic wheel mounting apparatus disclosed in Laid-Open Japanese Patent Application No. 62-173303, there has been proposed a technique for smooth delivery of hub nuts to a nut runner. Furthermore, Japanese Patent Publication No. 59-51422, discloses a control drive for a wheel positioning device which positions a wheel by rotating the wheel until tips of a fastener fit into bolt holes of the wheel.

OBJECTS AND SUMMARY OF THE INVENTION:

It is an object of the present invention to provide a wheel presetting apparatus capable of adjusting the rotational position of a wheel regardless of its outside diameter.

It is another object of the present invention to move a wheel to a predetermined angular position and to securely hold the wheel in the direction of its width, regardless of the width of the tire.

The apparatus according to the present invention which attains the above-mentioned objects, comprises a pair of driven lower rollers which support a wheel to be mounted and which are capable of rotating the wheel. A pair of upper rollers is mounted above the lower rollers. The upper rollers are capable of moving upwardly and downwardly in relation to a wheel supported on the lower rollers. A driving means moves the lower and upper rollers towards and away from each other. A center pin is movable towards and away from a center hole of the wheel supported by the rollers. A cylinder is provided for stroking the center pin. A bolt hole detecting means is provided for detecting the position of the bolt holes of the wheel rim of the wheel as it is rotated by the lower rollers with the center pin inserted into the center hole. Hub pin is movably supported for them to be inserted into bolt holes displaced angularly from the bolt holes detected by the bolt hole detecting means.

In addition to the above-described arrangement, the apparatus is equipped with hold-down rollers for pressing the wheel against the front side of the device. A hold-down cylinder is provided for driving the hold-down rollers, and a stopper means is provided which detects the forward end of the center pin.

In the apparatus of the present invention, a wheel is fed from above and is received and supported by a pair of lower rollers. Then, a pair of upper rollers are raised upwardly above the wheel. Subsequently, the lower and upper rollers are moved towards each other by the roller synchronous driving means, thus holding the wheel therebetween.

At this stage, the center pin moves forwardly, and is fitted into the center hole of the wheel.

Next, the lower rollers are rotated to rotate the wheel, and one of the bolt holes is detected by the bolt hole detecting means.

Then, the hub pin moves forwardly, and is inserted into other bolt hole displaced angularly from the bolt . hole used for detection. The wheel is thus held in a predetermined angular position in the circumferential direction.

During this operation, the wheel is held against the front side of the device by means of the hold-down roller. After the wheel adjustment described above, the center pin moves forwardly against the pressure of the hold-down roller, thus moving the wheel to the end of movement of the center pin.

According to the present invention, the circumferential attitude of the wheel can automatically be adjusted to the attitude of the vehicle hub. Different types of wheels having a different number of bolt holes and diameters ca also be adjusted to the required circumferential attitude. Thus, automation of wheel installation can be realized.

Since the apparatus is capable of moving the wheel by a specific distance in the direction of its axis, this enables the wheel mounting robot to perform an easy and smooth unloading of a wheel from the wheel feeder and the mounting the wheel to the hub.

Furthermore, since the wheel can properly be set in the predetermined position regardless of the wheel width as described above, the stroke of the wheel holding pawls of the wheel mounting robot can be fixed regardless of the wheel width. Therefore it is possible to simplify the movement of the wheel mounting robot.

BRIEF DESCRIPTION OF THE DRAWINGS:

FIG. 14 is a schematic plan view of the automatic wheel mounting apparatus; and

FIG. 15 is a front view thereof.

Figure 1:
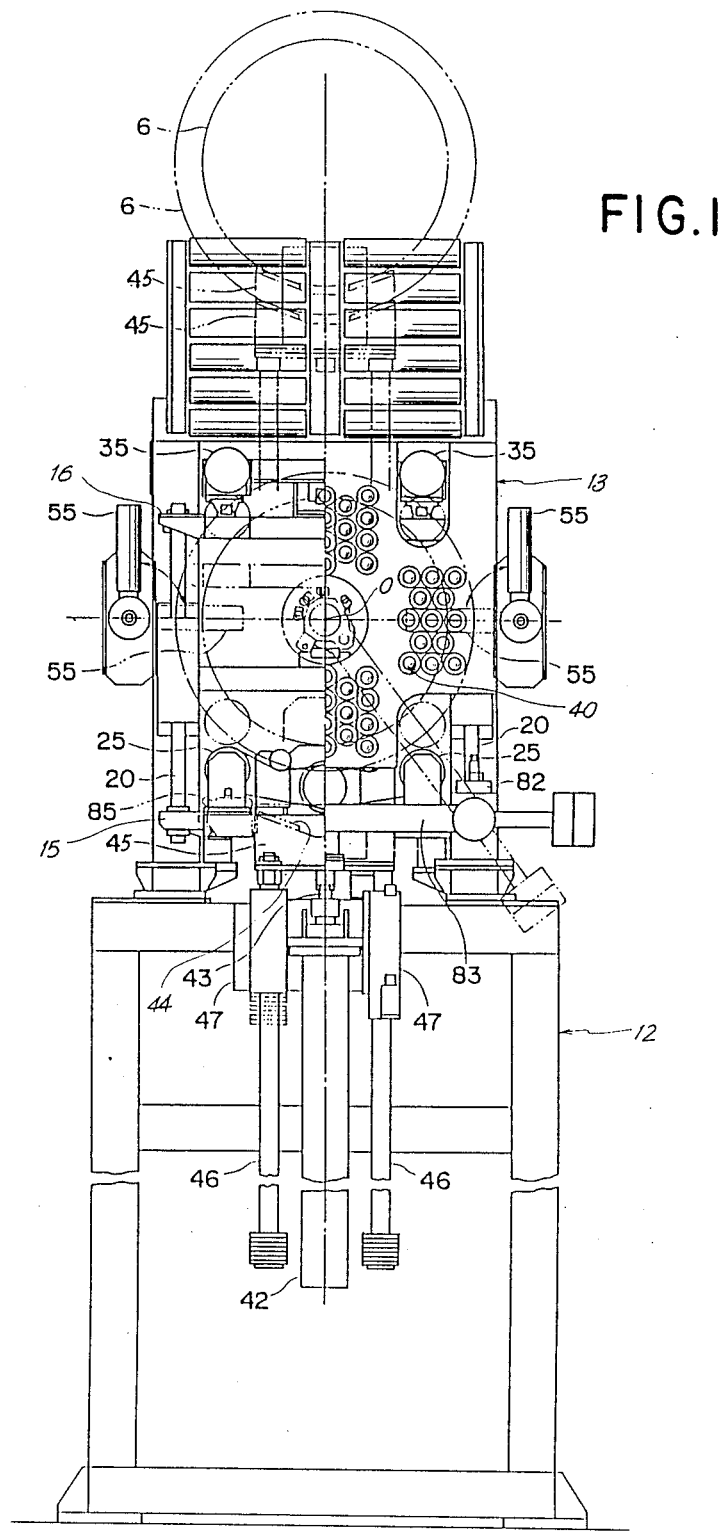
FIG. 1 is a front view of a wheel presetting apparatus according to one embodiment of the present invention.

DETAILED DESCRIPTION OF PREFERRED EMBODIMENTS:

As shown in FIG. 15, an automatic wheel feeder 3 is positioned over a shuttle conveyor 2 for conveying motor vehicles 1.

The wheel feeder 3 comprises, a main conveyor 4 extending in parallel with the shuttle conveyor 2, and, chutes 5 extending downwardly from the main conveyor 4 on both sides of the shuttle conveyor 2. A delivery member 7 pushes a wheel that has been carried flat on the main conveyor 4, obliquely upwardly and delivers the wheel to an orientating cage 8. The cage 8 is rotatable about an axis vertically inclined within a plane perpendicular to the direction of travel of the main conveyor 4.

The wheel 6 carried by the cage 8 rolls into the chute 5. A lever 9 is vertically rockingly mounted in the chute 5. The wheel 6 is supported on this lever 9, and is moved downwardly upon rotation of the lever 9. Under the chute 5 is a pair of wheel stand-by arms 10. The wheel 6 is received by these stand-by arms 10, which are in a closed state.

Below each chute 5 is a wheel setting apparatus 11 of the present invention.

Figure 2:
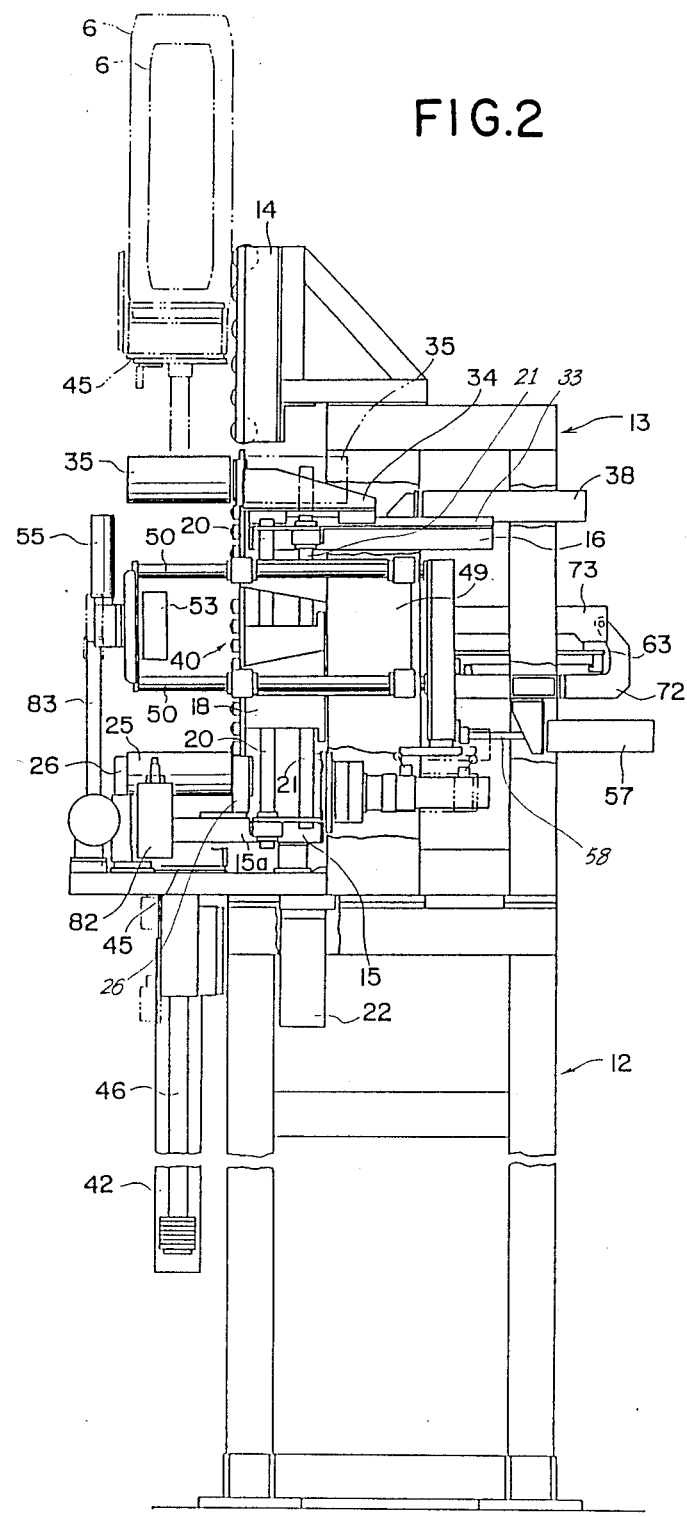
FIG. 2 is a side view thereof.
Figure 3:
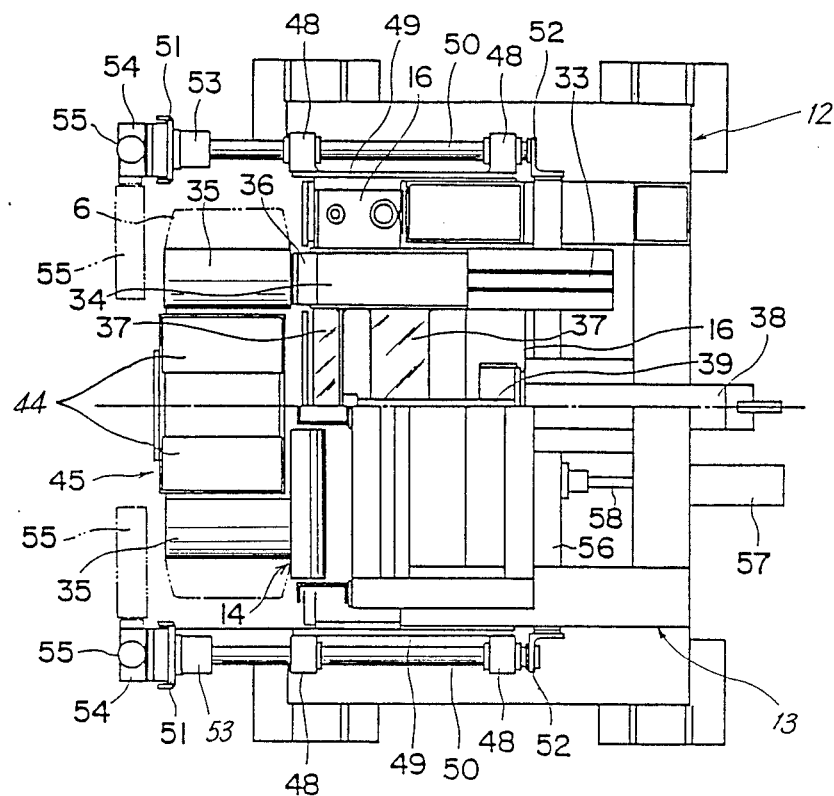
FIGS. 3 and 4 are plan views thereof differing in position.
Figure 4:
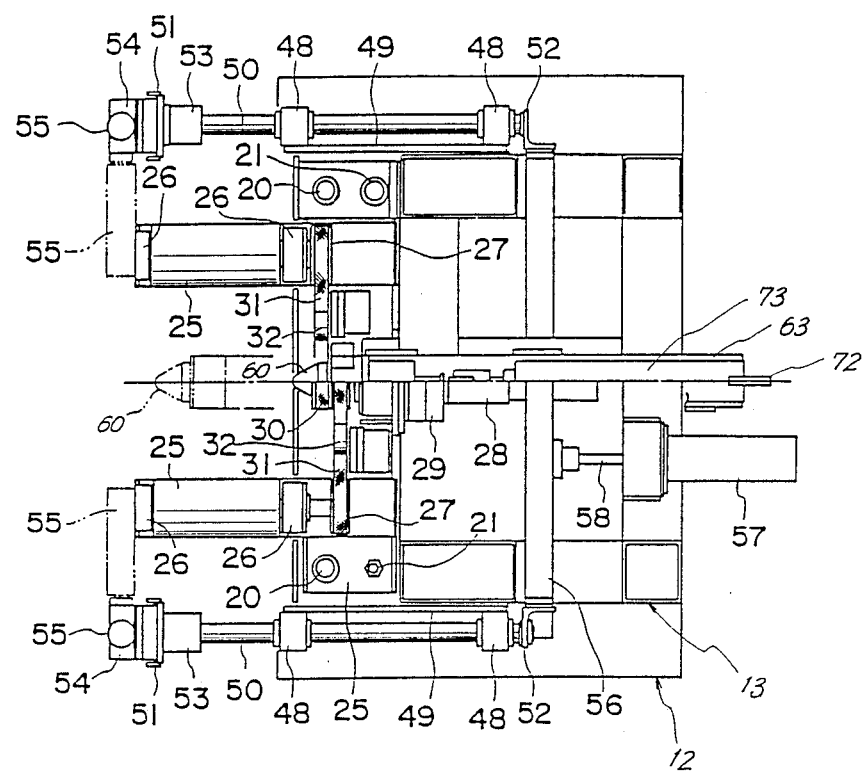

As shown in FIGS. 1 and 2, the apparatus 11 includes a lower frame 12 and an upper frame 13.

On the upper surface of the upper frame 13 there is provided a vertically extending roller table 14. The lower part of the stand-by arms 10 extend to the front side of the upper part of this roller table 14.

A horizontal lower slide frame 15 and an upper slide frame 16 are positioned vertically inside the upper frame 13. These frames are connected by a pinionrack synchronizing device 17 shown in FIGS. 6 and 7 at both the right and left ends such that these frames will be vertically moved towards and away from each other.

The constitution of the pinion-rack synchronizing device 17 is as follows.

On the front side of the upper frame 13 is mounted a gear box 18, in which a pinion 19 is rotatably supported. This pinion 19 is in mesh, on both sides, with two racks 20 and 21. These racks 20 and 21 are vertically slidably mounted through the gear box 18. The rack 20 is secured at the upper end to the upper slide frame 16 and the lower end thereof is vertically slidably mounted through the lower slide frame 15. The other rack 21 is secured at the lower end to the lower slide frame 15, and the upper end thereof is vertically slidably mounted through the upper slide frame 16. In the lower part of the upper frame 13 a synchronous driving cylinder 22 is mounted facing up, with a rod 23 thereof connected to the lower slide frame 15.

Accordingly, as the rack 21 is vertically moved together with the lower slide frame 15 by the operation of the synchronous driving cylinder 22, the upper slide frame 16 is moved in an opposite direction to the lower slide frame 15 by the pinion 19 and the rack 20. That is, the upper and lower slide frames 15 and 16 move towards or away from each other. In the drawings, numeral 24 denotes a linear slide guide which guides the linear movement of the rack, and numeral 41 indicates a seat (stopper) supporting the lower slide frame 15 located at the end of downward stroke.

Figure 8:
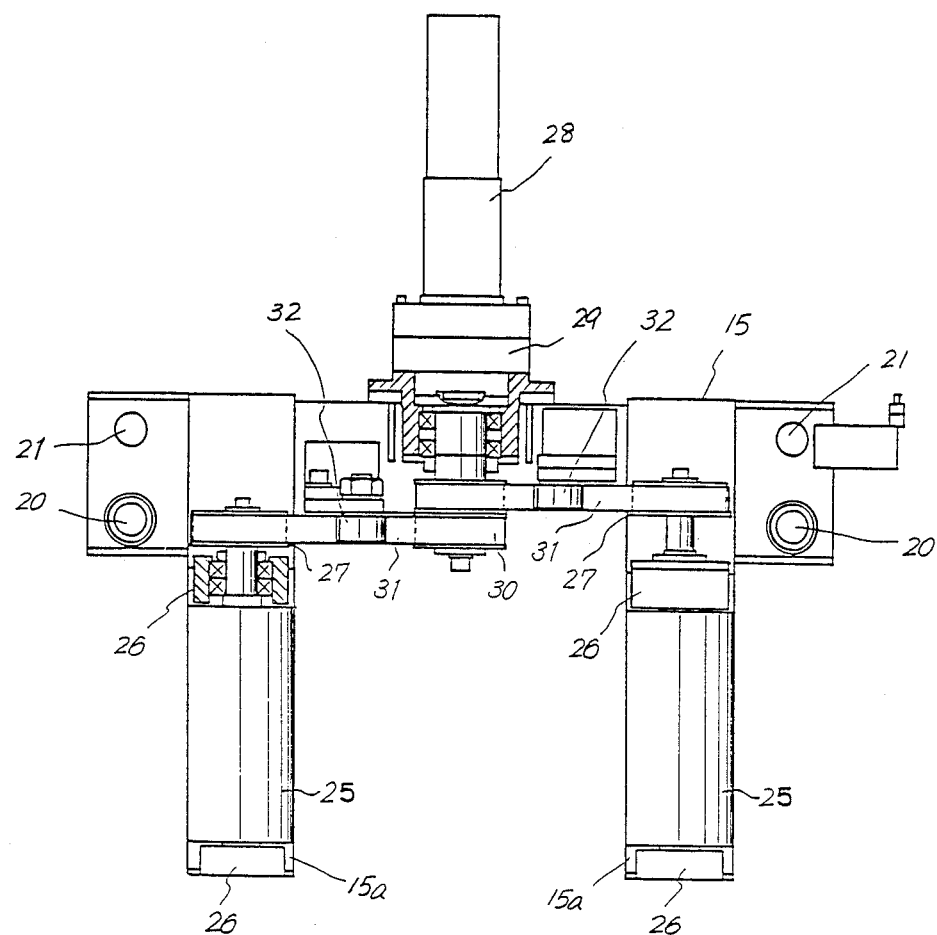
FIG. 8 is a plan view of a lower roller driving

In the lower slide frame 15, as shown in FIG. 8, a pair of roller support sections 15a are unitarily provided, extending forwardly in positions equally spaced from the frame center (the center in the longitudinal direction of the apparatus); on these roller support sections 15a, lower rollers 25 are rotatably supported on a bearing 26. These lower rollers 25, as shown in FIGS. 1 and 2, are located below the wheel 6 waiting on the roller table 14. On the shaft of each lower roller 25 is mounted a pulley 27. At the center of the lower slide frame 15, a variablespeed motor 28 is mounted through a speed reducer 29. On the output shaft of the speed reducer 29 is mounted a drive pulley 30. A belt 31 is installed between the drive pulley 30 and the pulley 27. In the drawing, numeral 32 is a tension pulley pressing the belt 31 downwardly to keep the belt 31 taut.

As the motor 28 turns, the lower rollers 25 are driven to rotate through the belt transmission mechanism. The motor 28 has two speeds: high and low speeds, and is designed to stop instantly with a great braking force.

On the upper slide frame 16, a pair of linear slide rails 33 are laid parallel in the longitudinal direction at the same distance as the lower rollers 25. On each linear slide rail 33 is slidably mounted a roller support base 34. In the front section of the roller support base 34, an upper roller 35 making up a set with the lower rollers 25 is rotatably supported on a bearing 36. The upper rollers 35 and the lower rollers 25 have the same distance between centers of rollers. The right and left roller support bases 34 are unitarily connected by the frame 37. At the center of this frame 37 is connected a rod of a cylinder furnished at the central part on the upper slide frame 16. Accordingly, as the cylinder 38 operates, the upper roller 35 moves forwardly or backwardly. At the end of the forward stroke, the upper roller 35 comes to a position corresponding to the lower roller 25. And at the end of the backward stroke, the upper roller 35 withdraws inwardly of the front side of the apparatus (to the position indicated by an alternate long and two short dashes line in FIG. 2), providing a space wide enough to allow easy downward movement of the wheel 6.

Since the lower roller 25 is supported by the lower slide frame 15, and the upper roller 35 by the upper slide frame 16, these rollers 25 and 35 are moved vertically towards and away from each other, together with the upper and lower slide frames 15 and 16, by means of the aforementioned pinion-rack synchronizing device 17. The rollers 25 and 35 are vertically moved towards and away from each other in relation to an intersection of diagonal lines of these rollers 25 and 35 at a center (hereinafter termed as an apparatus center O).

Beneath the central part between the lower rollers 25, a lifter cylinder 42 is mounted face up, at the front side of the upper part of the lower frame 12. At the upper end portion of the rod 43, a lifter 45 having a V-shaped wheel receiving seat 44 on the upper surface is connected. On the lower surface of the lifter 45 the upper ends of two guide rods 46 extending vertically downwardly are connected. These guide rods 46 are vertically slidably enclosed in a guide post 47 provided at the front side of the upper part of the lower frame 12.

As the lifter cylinder 42 is actuated, the lifter 45 can extend upwardly, passing between the lower rollers 25 and further between the upper rollers 35. At the end of upward stroke, the wheel 6 held by the standby arms 10 at the lower part of the chute 5 is supported from beneath. At the end of upward stroke, the wheel 6 is detected by the limit switch.

On both the right and left sides of the upper frame 13, a guide post 49 having four linear guides 48, front and rear and upper and lower, is mounted. In the upper and lower and front and rear linear guides 48, a guide shaft 50 is slidably mounted. The forward end-toforward end and the rear end-to-rear end connection of two upper and lower guide shafts 50 are unitarily made on brackets 51 and 52. On the back side at the center in the vertical direction of the bracket 51 at the front end side, a rotary actuator 53 is mounted, directed forwardly. On the rotating shaft thereof, a ring 54 is integrally mounted. To this ring 54 is connected the end shaft portion of a press roll 54 which is perpendicular to the rotating shaft described above. The right and left press rolls 55 are rotated through 90 degrees from a vertical position to the front side of the apparatus by the operation of the rotary actuator 53.

In the meantime, brackets 52 at the rear end side of the right and left guide shafts 50 are connected to each other by a frame 56, to which the forward end of a. rod 58 of the hold-down cylinder 57 fixedly mounted on the upper frame 13 is connected. Therefore, as the hold-down cylinder 57 operates, the press roll 55 is longitudinally reciprocated together with the guide u shaft 50.

The press roll 55 that has been rotated through 90 degrees to a horizontal position is withdrawn backwardly, thereby pressing the wheel 6 on the lower roller 25 against the front side of the apparatus. On the front side of the apparatus, a ball table 40 is mounted through the gear box 18. The stroke of movement of the press roll 55 is restricted by a limit switch.

Figure 9:
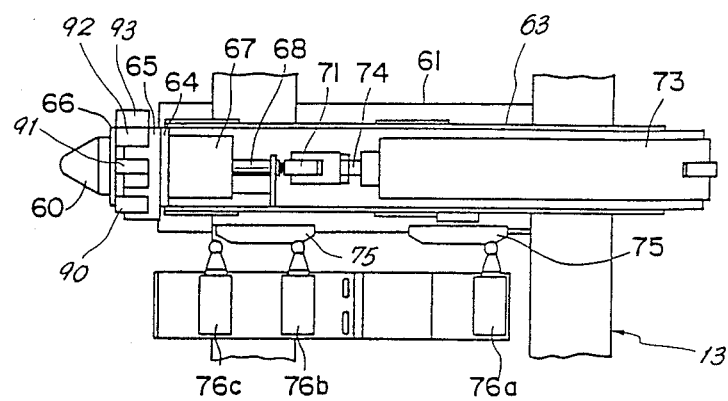
FIG. 9 is a plan view of a center pin.
Figure 10:
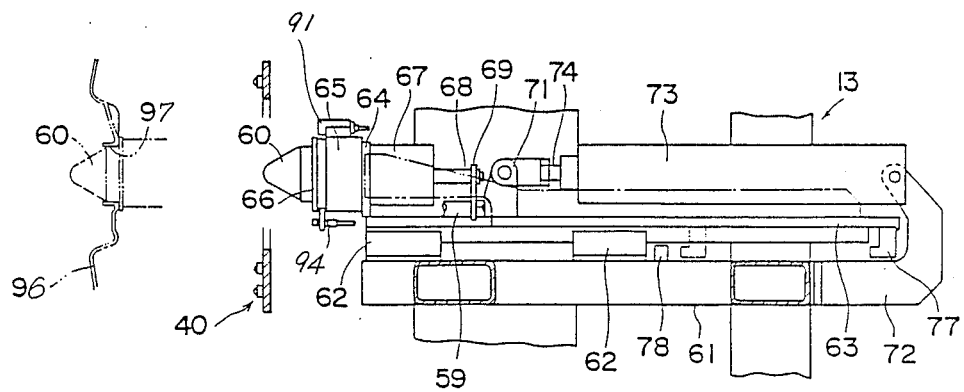
FIG. 10 is a side view thereof.
Figure 11:
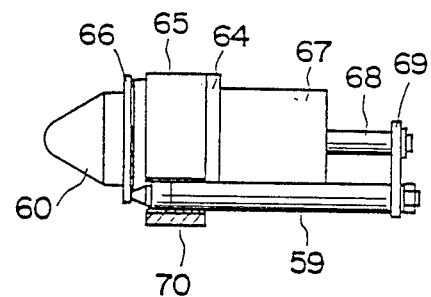
FIG. 11 is an enlarged view showing the front portion of the center pin.

In the central part in the upper frame 13, a center pin 60 having a hub pin 59 is longitudinally movably installed, the details of which are shown in FIGS. 9 to 11.

A support frame 61 is mounted in the vicinity of the central part in the upper frame. At the front and rear on this support frame 61 linear guides 62 are disposed. On the linear guides 62 a slide base 63 is longitudinally slidably mounted. .At the front and rear of the slide base 63 is attached a bracket 64. On the front side of this bracket 64 is rotatably supported the aforementioned center pin 60 through bearing 65. This center pin 60 is of a conical form and has a flange 66 at the root thereof. The center of the center pin 60 coincides with the center O of the apparatus.

On the back side of the bracket 64 a hub pin cylinder 67 is mounted face back. At the forward end (the rear end when viewed in the longitudinal direction of the apparatus) of a rod 68 of the hub pin cylinder 67, a connecting bracket 69 is mounted obliquely downwardly in the lateral direction. To this connecting bracket 69 is connected the rear end portion of the hub pin 59 which is parallel with the center pin 60. On the bearing 65 a guide section 70 is installed. The hub pin 59 is longitudinally slidably inserted through the guide section 70. Therefore, as the hub pin cylinder 69 operates, the hub pin 59 moves forwardly and backward independently of the center pin 60.

Figure 5:
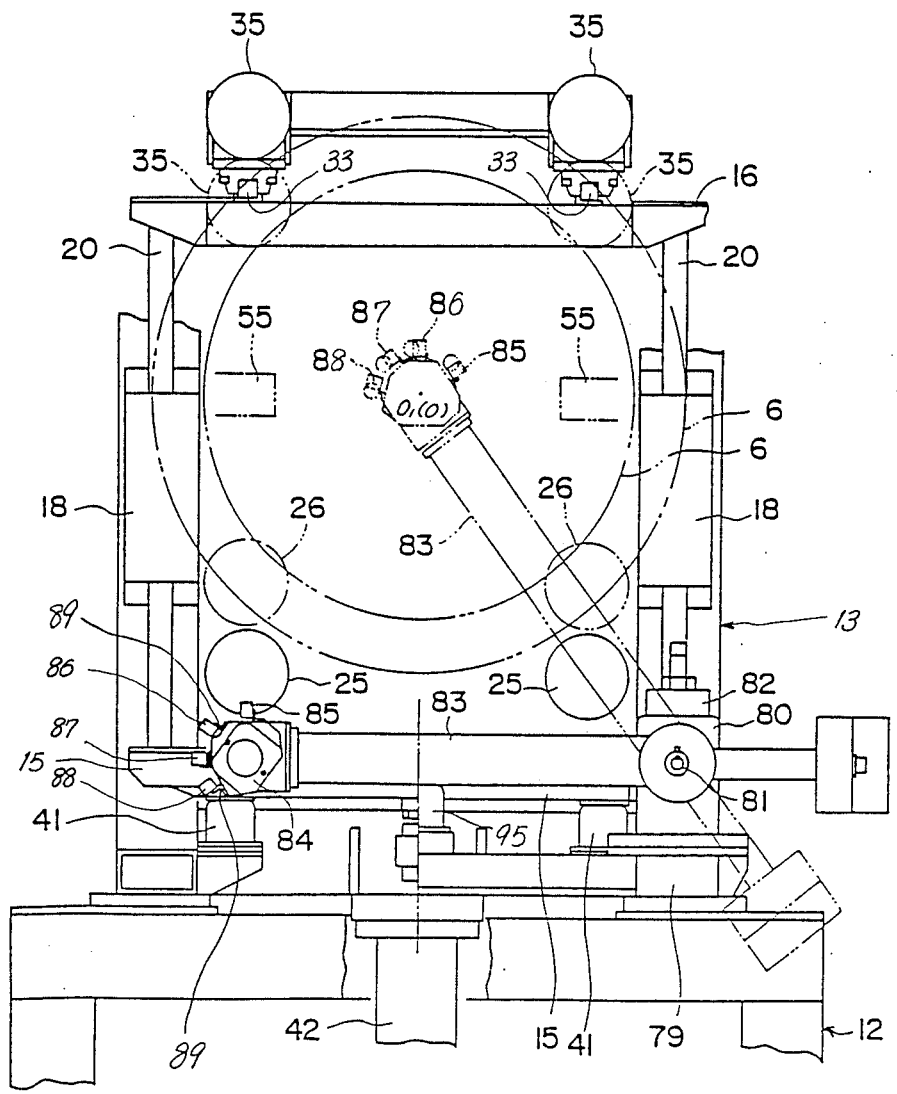
FIG. 5 is a front view of the central part of the apparatus.
Figure 6:
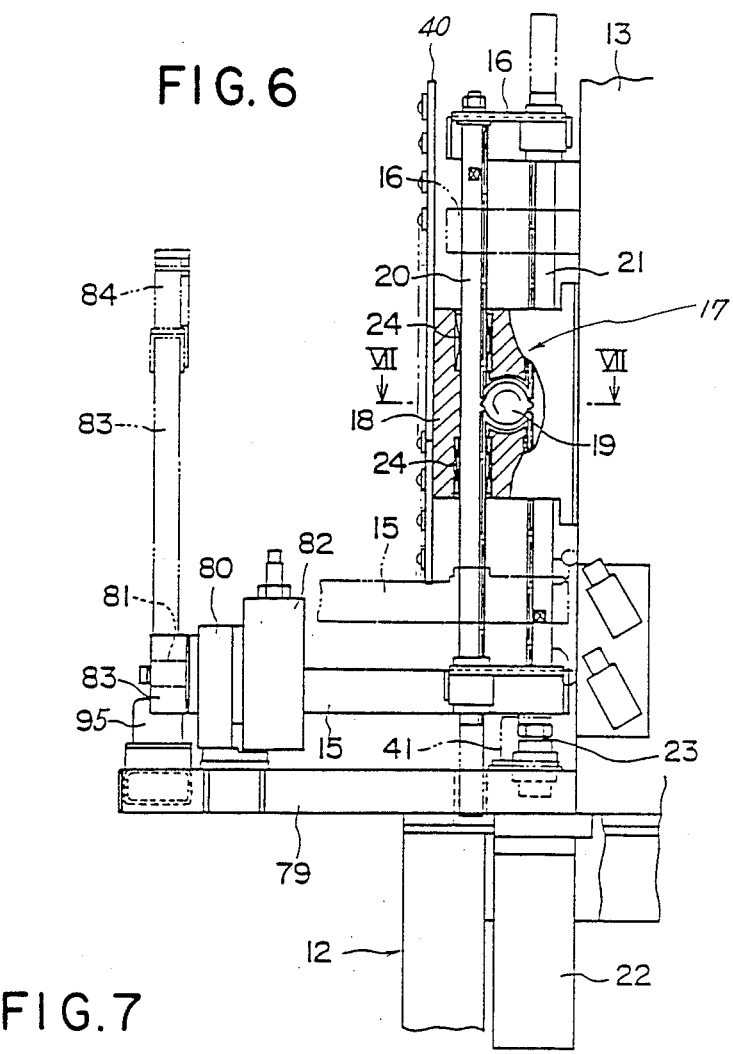
FIG. 6 is a side view of the central interior of the apparatus.
Figure 7:
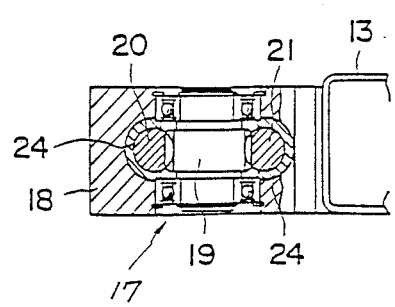
FIG. 7 is a sectional view taken along line VII—VII thereof.
Figure 12:
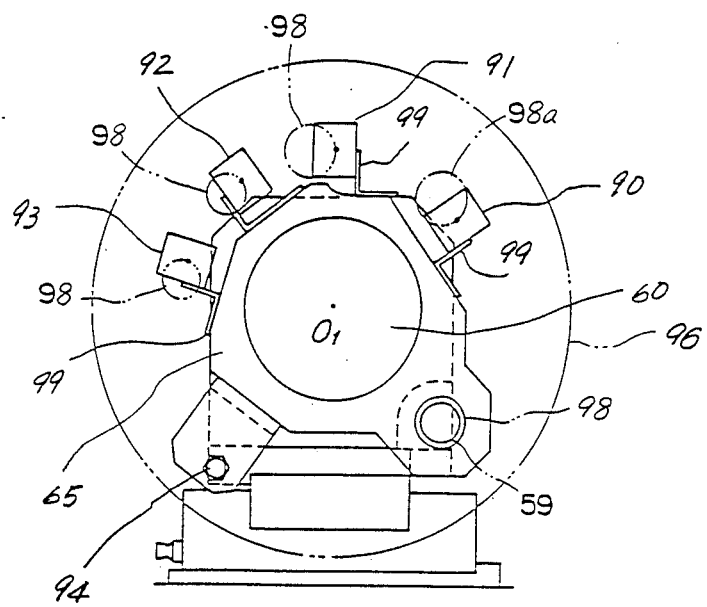
FIG. 12 is a front view showing a group of light receivers together with the center pin.
Figure 13A:
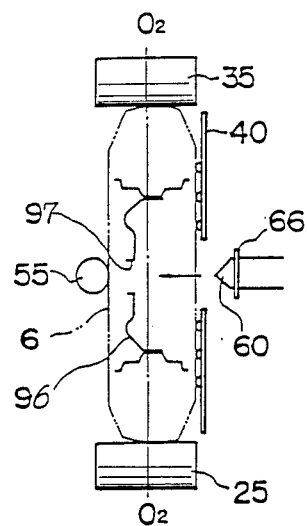
FIG. 13 is an explanatory view showing the operation to stop the wheel in a fixed position.
Figure 13B:
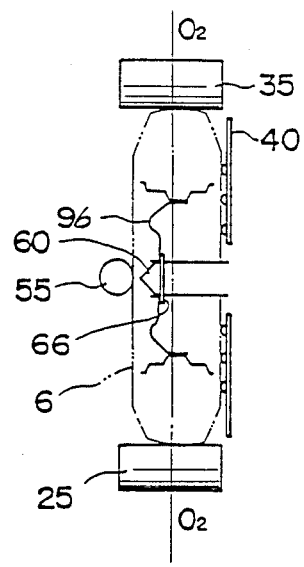
Figure 13C:
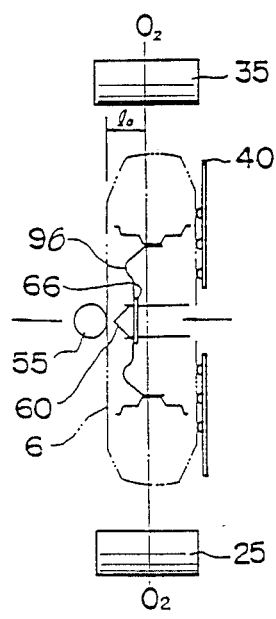
Figure 13D:
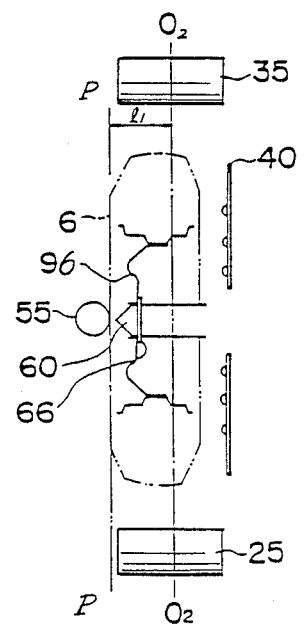

A coupling 71 is connected to the forward end of a rod 74 of a cylinder 73 for center pin pivotally mounted at the rear end to the cylinder bracket 72 extending from the support frame 61 side. With the operation of the cylinder 73 for center pin, the slide base 63 reciprocates on the linear guides 62, and accordingly the center pin 60 also is reciprocated. On the side of the slide base 63 is mounted a dog plate 75, and on the support frame 61 side are provided limit switches 76a, 76b and 76c, which serve to limit the range of movement of the center pin 60. On the lower surface of the slide base 63 a stop pawl 77 is integrally provided, and on the support frame 61 is projectingly provided a stopper 78. When the stop pawl 77 has come in contact with the stopper 78, the slide base 63 will stop at the end of forward stroke. That is, the center pin 60 is designed to stop at the end of projection. As shown in FIGS. 5 and 6, a support frame 79 is provided protruding forwardly in the lower part of the upper frame 13, and on the front part of the support frame 79 is mounted a bearing 80, by which a rotating shaft 81 parallel in the longitudinal direction is rotatably supported. On the back side of the bearing 80 is mounted a rotary actuator 82, the drive shaft of which is connected to the rotating shaft 81. The rotating shaft 81 proJects forwardly beyond the bearing 80. To the proJecting portion, the base end portion of a switch mounting arm 83 is integrally mounted. At the forward end of the switch mounting arm 83, a switch mounting block 84 is installed. Around the switch mounting block 84, four light emitters 85, 86, 87, 88 of a light-transmission photoelectric switch are mounted through a bracket 89. The center $O_1$ of the switch mounting block 84 is set to coincide with the center O of the apparatus by the rotation of the switch mounting arm 83. Each of the light emitters 85 to 88 is disposed on a concentric circle having the center $O_1$ (a circle of the same diameter as the pitch circle of the wheel bolt holes). Furthermore, as shown in FIG. 12, light receivers 90, 91, 92, 93 constituting the light-transmission photoelectric switch corresponding to the light emitters 85 to 88 are mounted through a bracket 99. The center pin 60 is provided with a proximity switch 94 which detects the presence of a wheel.

The light emitters 85 to 88 are used for the detection of bolt holes of a wheel rim, and accordingly only when used, the light emitters are moved to the central part of the apparatus by the switch mounting arm 83 as indicated by an alternate long and two short dashes line in FIG. 5. In this state, the light emitters 85 to 88 face the light receivers 90 to 93 respectively.

The number of the light emitters 85 to 88 and the light receivers 90 to 93 is determined by the type of the wheel, that is, by the number and diameter of bolt holes. In the present embodiment, four light emitters and four light receivers are provided to be usable with two types of wheels each having four or five bolt holes and with two types of wheels each having 15 mm- or 19 mm-diameter bolt holes. These light emitters and light receivers are so disposed as to come in a predetermined positional relation to the aforementioned hub pins 59. Namely, as shown in FIG. 12, when each of the light receivers 90, 91, 92, and 93 is in the position in which it faces the edge of a corresponding bolt hole, the hub pin 59 faces a bolt hole out of the phase. To state concretely, the light receiver 90 is used when mounting the wheel 6 having four 19 mm-diameter bolt holes, being "90°" —(Angle equal to the radius of bolt hole)" apart from the hub pin 59. Similarly, the light receiver 91 is used when mounting a wheel having five 19 mm-diameter bolt holes, and is set "144°" —(Angle equal to the radius of bolt hole)" apart from the hub pin 59. The light receivers 92 and 93 are used when mounting a wheel having four 15 mm-diameter bolt holes and a wheel having five 15 mm-diameter bolt holes, being "180°" —(Angle equal to the radius of bolt hole)" and "216°" —(Angle equal to the radius of bolt hole)" apart from the hub pin 59.

When the detection of bolt holes of a wheel is not needed, the switch mounting arm 83 remains in its horizontal position as indicated by a full line in FIG. 5, and the light emitters 85 to 88 remain in the standby position below. In FIG. 5, numeral 59 represents a seat (stopper) supporting the switch mounting arm 83 remaining in the horizontal position.

Next, the centering and phase adjustment of the wheel 6 by the wheel presetting apparatus of the abovedescribed constitution will be explained. In FIGS. 1, 2 and 5, the wheels 6 of the smallest and largest diameters are shown.

The wheel 6, as described above, is supplied by the automatic wheel feeder 3, being held by the wheel standby arms 10 in the lower part of the branching chute 5.

As the lifter cylinder 42 in the wheel presetting apparatus 11 expands, the lifter 45 moves upwardly as high as the lower side of the wheel 6 as indicated by an alternate long and two short dashes line in FIGS. 1 and 2, and the stand-by arms 10 open, moving the wheel 6 on to the lifter 45. The upper roller 35 moves from the front side of the apparatus to the back, providing a space to allow the movement of the wheel 6.

Subsequently, as the lifter cylinder 42 contracts, the wheel 6 goes downwardly together with the lifter 45. When the lifter 45 has reached the lower side of the lower roller 25, the wheel 6 is transferred to the lower roller 25. The wheel 6, when moving downwardly, is guided by the roller table 14.

Parallelly with, or prior to, the above-described operation, a pair of press rolls 55 are rotated through 90 degrees to the horizontal position on the front side of the apparatus as indicated by an alternate long and two short dashes line in FIG. 1. Then, when the wheel 6 rides on the lower roller 25 as stated above, the press rolls 55 move backwardly for a predetermined distance, the wheel being held in between the press rolls 55 and the ball table 40 at the front side of the apparatus.

Subsequently, when the pinion-rack synchronizing device 17 operates, the lower roller 25 and the upper roller 35 approach each other, stopping where the upper roller 35 will hit the upper side of the wheel 6. Since the lower roller 25 and the upper roller 35 make a symmetrical movement in relation to the apparatus center O, the wheel 6 is nearly centered in the condition that the upper and lower rollers 25 and 35 are in contact with the wheel 6. FIG. 13 (a) is a schematic representation showing this condition. In FIG. 13, $O_2$—$O_2$ denotes the center of the upper and lower rollers 25 and 35 in the direction of length.

The above described centering operation is effected, using the peripheral surface of the wheel 6 as a reference. The peripheral surface of the wheel 6, however, has no satisfactory accuracy to be used as a reference for centering. Then, as the center pin cylinder 73 operates, the center pin 60 moves forwardly. As indicated by an alternate long and two dashes line in FIG. 10 and as schematically indicated in FIG. 13 (b), the wheel 6 is centered accurately by fitting the center pin 60 in a center hole 97 of a wheel rim 96.

Prior to the centering of the wheel 6, the rotary actuator 82 operates, turning the switch mounting arm 83 through a preset angle and aligning the center $O_1$ of the switch mounting block 84 with the apparatus center O.

After the centering of the wheel 6, the variablespeed motor 28 is run at a high speed, driving the lower roller 25 at a high speed. Thus the wheel 6 on the lower roller 25 is turned fast and the bolt holes 98 are detected by the light-transmission photoelectric switches.

In detecting the bolt holes, one of the four light receivers 90, 91, 92 and 93 is selected according to the type of the wheel 6 that has been determined in accordance with vehicle model information previously known. The detection of bolt holes 98 is performed by means of this light receiver. For example, when the wheel 6 to be installed has four 19 mm-diameter bolt holes 98, the light receiver 90 will operate. With the rotation of the wheel 6, the bolt hole 98 faces the light receiver 90, then the light from the light emitter 85 is received by the light receiver 90, which in turn produces an ON signal. According to the present embodiment, for the purpose of insuring the stability of detecting conditions and accuracy improvement, when the second ON signal after the start of detection is produced, that is, when the second bolt hole 98 has come to face the light receiver 90, the speed of rotation of the variable-speed motor is decreased by the signal and the edge of the second bolt hole 98 faces the light receiver 90, intercepting the light. When the signal is turned off, the variable-speed motor 28 is stopped. As shown in FIG. 12, in the condition that the edge of one bolt hole 98a of the wheel rim 96 of the wheel 6 faces the light receiver 90, another bolt hole 98 differing in phase from this bolt hole 98a comes to face the hub pin 59.

Hereafter, as the pinion-rack synchronizing device 17 operates, the lower roller 25 and the upper roller 35 are vertically moved away from each other. Accordingly, the wheel 6 is supported only by the center pin 60.

In the above-described state, when the hub pin cylinder 67 operates, the hub pin 59 moves forwardly to fit in the bolt hole 98 which is in the predetermined phase of the bolt hole 98a detected. Thus the wheel 6 is positioned and held in the position of predetermined angle of rotation in the circumferential direction. When the hub pin 59 is inserted, the upper and lower rollers 25 and 35 are released to permit slight rotation of the wheel 6 at the time of insertion of the hub pin 59 into the bolt hole 92.

In the case of a different type of wheel 6, other light receivers 91, 92 and 93 will be used according to the type of wheel 6 to be mounted. And by detecting bolt holes in a similar manner, another bolt hole out of phase can be set facing to the hub pin 59.

The wheel 6, centered and phase-adjusted in the circumferential direction as described above, will be taken out by the wheel mounting robot. Prior to this, the wheel 6 is pushed forwardly as far as a predetermined position.

Next, as a high pressure is supplied to the center pin cylinder 73, the center pin 60 moves forwardly against the wheel hold-down pressure of the press roll 55 driven by the hold-down cylinder 57. The wheel 6 held in between the flange 66 of the center pin 60 and the press roll 55 is pushed forwardly. When the wheel 6 has been pushed out as far as a predetermined position, the stop pawl 77 of the slide base 63 will come in contact with the stopper 78, stopping the center pin 60. Thus, the wheel 6 moves from the position shown in FIG. 13 (c) to the position shown in FIG. 13 (d). That is, the wheel rim 96, or in other words, the outside surface of the wheel 6, is moved to a predetermined position.

Therefore, once the reference plane P is set at the outside surface of the wheel 6 at the end of movement, the outside surface of the wheel 6 can readily be set to the reference plane P regardless of the width of the wheel 6. In FIG. 13 (c) and (d), changes in a distance from the center line $O_2$ of the upper and lower rollers 25 and 35 in the direction of length to the outside surface of the wheel 6 are represented by "$\lambda_0$" and "$\lambda_1$".

As described above, after the wheel 6 has been centered and adjusted in its circumferential posture, and has finished its movement to the predetermined position, the press roll 55 turns to move away from the side of the wheel 6. In this state, the wheel 6 is taken out and installed to the hub of the motor vehicle by the wheel mounting robot.

As shown in FIG. 14 showing a plan view of an automatic wheel mounting apparatus using the wheel mounting robot as one of its components, the automatic wheel mounting apparatus 101 is mounted on either side of the shuttle conveyor 2, and has a wheel mounting robot 102, a nut feeder 103, a nut loader 104, and a nut robot 105. The nut feeder 103 has six sets of nut holding sections 106 for holding different types of nuts to be handled on this assembly line and supplies these nuts to a predetermined delivery position 107. The nut loader 104 supplies, to the wheel mounting robot 102, a plurality of nuts required for mounting one wheel to a hub. It has a base 108 having a plurality of nut support sections arranged in the same relative positions of hub bolts. This base 108 is available in two types: one having four nut-supporting sections for installing four nuts, and one having five nut-supporting sections for installing five nuts, which are selected according to the type of vehicles. The nut robot 105 grips a nut in the nut delivery position 107 on the nut feeder 103, and places a required quantity of nuts on the base 108 of this nut loader 104.

The wheel mounting robot 102 has a head 109 movable both horizontally in the X-Y axis direction and vertically in the Z-axis direction, and rotatable about the Z axis in the C-axis direction. This head 109 has a measuring and positioning section 110 and a wheel mounting section 111. These measuring and positioning section 110 and wheel mounting section 111 also come in two types as the above-mentioned base 108: one for four nuts and one for five nuts and are located on opposite sides. The measuring and positioning section 110 functions to measure the hub center in order to effect the centering of the wheel mounting robot 102, and to rotate for positioning the hub in a specific position. The wheel mounting section 111 has a plurality of nut runners (not shown) in the same relative position as the hub bolts, at the central section, and wheel holding pawls on the outer periphery.

According to the wheel presetting apparatus described above, in mounting wheels, the motor vehicle 1 is positioned in a predetermined position by the positioning apparatus 113, and the hub is also positioned by pushing the lower arm of the suspension by the lifting device 114. Then, after receiving nuts on the nut runner of the wheel mounting section 11 from the nut loader 104, the wheel mounting robot 102 is properly positioned over against the wheel presetting apparatus 11 and is operated to hold the wheel 6 from a predetermined position by the wheel holding pawls 112. Next, the measuring and positioning section 110 is properly faced to the hub, performing the centering of the wheel mounting robot 102 and the positioning of the hub. Subsequently, the head 109 is rotated 90 degrees to position the wheel mounting section 111 over against the hub, the wheel 6 is pressed to the hub, and then the nuts are screwed onto the hub bolts, thus mounting the wheel.

What is claimed is:

1. A wheel presetting apparatus, including:
   a pair of driven lower rollers for supporting a wheel;
   a pair of upper rollers mounted above said lower rollers, and movable into engagement with an upper side of a wheel supported on said lower rollers;
   a synchronous driving means for moving said lower and upper rollers towards and away from each other;
   a center pin supported for forward and backward movement in relation to a center hole of a wheel held by said upper and lower rollers;
   a bolt hole detecting means for detecting the position of bolt holes in a wheel rotated by said lower rollers; and
   a hub pin supported for forward and backward movement and insertable into a bolt hole angularly displaced from a bolt hole detected by said bolt hole detecting means.

2. A wheel presetting apparatus of claim 1, further including press rolls for pressing a wheel supported by said lower rollers against a front side of said apparatus;
   a hold-down cylinder for providing said press rolls with a holding pressure.

3. A wheel presetting apparatus of claim 2 including a center pin cylinder capable of moving said center pin into the center hole of said wheel, and for advancing said center pin against a pressure of said press rolls.

4. A wheel presetting apparatus of claim 3, including stopper means for stopping movement of said center pin when said wheel has been moved to a predetermined position by the forward movement of said center pin.

5. A wheel presetting apparatus as claimed in claim 3, wherein said center pin is mounted on a slide base, said slide base being moved forwardly and backwardly by said center pin cylinder in relation to a stationary frame of said apparatus;
   and on the side of said center pin said hub pin is supported, said hub pin being independently moved forwardly and backwardly by a hub pin cylinder mounted on said slide base.

6. A wheel presetting apparatus as claimed in claim 1, wherein said synchronous driving means for said rollers comprises a first rack having a lower part thereof connected to a lower slide frame supporting said pair of lower rollers;

a second rack in parallel with said first rack and having an upper part thereof connected to an upper slide frame supporting said pair of upper rollers;

a pinion in mesh with both of said racks; and, driving means for said pinion.

7. A wheel presetting apparatus as claimed in claim 1, wherein a wheel receiving seat is located beneath between said pair of lower rollers, said wheel receiving seat being movable up and down between a wheel waiting position and a wheel receiving position above said upper rollers.

8. A wheel presetting apparatus as claimed in claim 1, wherein photoelectric switches each comprising a light emitter and a light receiver, are used as said bolt hole detecting means; a plurality of light emitters and light receivers are provided around said center pin;

a switch mounting block is provided forwardly and backwardly movable on the extension of a center line of said center pin; and, said block is provided with light receivers or light emitters correspondingly to said light emitters or light receivers.

9. A wheel presetting apparatus as claimed in claim 1, wherein a support frame is provided extending to the front side of said apparatus;

at the front part of said support frame is mounted a rotary actuator for driving a rotary shaft;

the lower part of a switch mounting arm is connected to said rotary shaft;

said switch mounting block is provided at the forward end of said switch mounting arm;

and said switch mounting arm is driven to rotate by said rotary actuator, such that said switch mounting block will move on the extension of the center line of said center pin.

10. A wheel presetting apparatus as claimed in claim 1, wherein on both sides of the frame of said apparatus are mounted longitudinally movable slide shafts, said slide shafts being connected to a hold-down cylinder such that said slide shaft can be driven to move longitudinally; and, at the forward end of said slide shaft is provided a rotary actuator with a rotating shaft, said rotating shaft of said rotary actuator being connected to the base part of said press rolls, such that said press rolls, driven by said rotary actuator, will move to and away from the front side of said apparatus.

11. A wheel presetting apparatus as claimed in claim 1, wherein a ball table is mounted on the front side of said apparatus.

* * * * *